(12) United States Patent
Chemin et al.

(10) Patent No.: US 9,718,376 B2
(45) Date of Patent: Aug. 1, 2017

(54) ELECTRICITY SUPPLY SYSTEM HAVING DOUBLE POWER-STORAGE DEVICES OF A HYBRID OR ELECTRIC MOTOR VEHICLE

(71) Applicant: VALEO EQUIPEMENTS ELECTRIQUES MOTEUR, Créteil (FR)

(72) Inventors: Michael Chemin, Festigny (FR); Philippe Baudesson, La Boissiere (FR)

(73) Assignee: Valeo Equipements Electriques Moteur (FR)

( * ) Notice: Subject to any disclaimer, the term of this patent is extended or adjusted under 35 U.S.C. 154(b) by 309 days.

(21) Appl. No.: 14/438,048

(22) PCT Filed: Oct. 29, 2013

(86) PCT No.: PCT/FR2013/052587
§ 371 (c)(1),
(2) Date: Apr. 23, 2015

(87) PCT Pub. No.: WO2014/068245
PCT Pub. Date: May 8, 2014

(65) Prior Publication Data
US 2015/0283913 A1    Oct. 8, 2015

(30) Foreign Application Priority Data

Oct. 31, 2012   (FR) ...................................... 12 60411

(51) Int. Cl.
*B60L 11/18*   (2006.01)
*H02M 3/335*   (2006.01)
(Continued)

(52) U.S. Cl.
CPC ............. *B60L 11/1868* (2013.01); *B60L 7/14* (2013.01); *B60L 11/005* (2013.01);
(Continued)

(58) Field of Classification Search
CPC .................................................. B60L 11/1868
See application file for complete search history.

(56) References Cited

U.S. PATENT DOCUMENTS

| | | | |
|---|---|---|---|
| 7,221,064 B2* | 5/2007 | Okuda ................ | F02N 11/0866 307/10.1 |
| 8,862,295 B2* | 10/2014 | Dessirier .................. | B60K 6/28 701/22 |

(Continued)

*Primary Examiner* — Hai L Nguyen
(74) *Attorney, Agent, or Firm* — Berenato & White, LLC

(57) ABSTRACT

An electricity supply system having double power-storage devices which is suitable for implementation in an electric or hybrid motor vehicle. The supply system is intended for being connected to a power network of the vehicle. The supply system is of the type that includes a first power-storage device, having a first specific energy, a first specific power and a first operating voltage (Ue), and a second power-storage device, having a second specific energy that is lower than the first specific energy, a second specific power that is higher than the first specific power and a second operating voltage (Up) that is higher than the first operating voltage (Ue). The first and second power-storage devices are electrically coupled by a bidirectional DC-DC converter controlled in accordance with the operating states of the vehicle. The DC-DC converter includes a floating capacitor connected in series between the first and second power-storage devices.

23 Claims, 3 Drawing Sheets

(51) Int. Cl.
*H02J 7/34* (2006.01)
*B60L 7/14* (2006.01)
*B60L 11/00* (2006.01)

(52) U.S. Cl.
CPC ....... *B60L 11/1803* (2013.01); *B60L 11/1811* (2013.01); *B60L 11/1853* (2013.01); *H02J 7/34* (2013.01); *H02M 3/33584* (2013.01); *B60L 2210/10* (2013.01); *B60L 2210/30* (2013.01); *B60L 2240/547* (2013.01); *B60L 2240/549* (2013.01); *Y02T 10/7005* (2013.01); *Y02T 10/7022* (2013.01); *Y02T 10/7066* (2013.01); *Y02T 10/7216* (2013.01); *Y02T 10/7241* (2013.01)

(56) References Cited

U.S. PATENT DOCUMENTS

| | | |
|---|---|---|
| 2009/0171521 A1 | 7/2009 | Moki et al. |
| 2010/0133900 A1 | 6/2010 | King |

* cited by examiner

ELECTRICITY SUPPLY SYSTEM HAVING DOUBLE POWER-STORAGE DEVICES OF A HYBRID OR ELECTRIC MOTOR VEHICLE

CROSS-REFERENCE TO RELATED APPLICATIONS AND CLAIM TO PRIORITY

This application is a national stage application of International Application No. PCT/FR2013/052587 filed Oct. 29, 2013, which claims priority to French Patent Application No. 1260411 filed Oct. 31, 2012, of which the disclosures are incorporated herein by reference and to which priority is claimed.

TECHNICAL FIELD OF THE INVENTION

The present invention relates to an electrical supply system with double electrical energy storage devices for an electric or hybrid motor vehicle.

TECHNOLOGICAL BACKGROUND OF THE INVENTION

Motor vehicles with a thermal engine conventionally comprise an on-board electrical network comprising a battery, generally a 12 V battery, which is designed to supply the various items of equipment with electrical energy, in particular a starter, which is essential in order to ensure starting of the thermal engine. After the starting, an alternator which is coupled to the thermal engine ensures that the battery is charged.

Nowadays, the development of power electronics has made it possible to supply and control a single reversible polyphase rotary electrical machine which advantageously replaces the starter and the alternator.

In a first stage, this machine, which is known as an alternator-starter, essentially had the purpose of fulfilling the functions previously dedicated to the alternator and the starter, and, in addition, of recuperating energy from the braking, or providing the thermal engine with additional power and torque.

For the purpose of increasing the power and improving the performance of the alternator-starter by increasing its operating voltage, whilst maintaining the possibility of using other standard equipment designed for a 12 V to 14 V supply, in particular the lead batteries, a so-called "14+X" or "micro-hybrid" architecture has been developed.

This architecture thus consists of an electrical power network which connects the alternator-starter to an electrical energy storage element which functions at a voltage higher than 14 V, and can be as much as 48 V, and of an electric service network which connects all the other equipment. The adaptation of the voltage levels between the two networks is ensured by a reversible direct-direct converter.

In a second stage, ecological considerations led to design of alternator-starters with power of approximately 8 to 10 kW, which is sufficient to drive the vehicle at low speed, for example in an urban environment.

Power levels of this type have been able to be obtained, whilst continuing to have compact electrical machines, only by increasing the voltage of the electrical power network to a voltage of approximately 60 V, which is far higher than the nominal voltage of conventional lead batteries.

Furthermore, power networks with voltages of up to 120 V can be implemented in an architecture which allows the vehicle to be driven at full speed by the electric motor (so-called full-hybrid architecture, as opposed to the previous so-called mild-hybrid architecture).

In order to carry out the functions specific to the aforementioned hybrid vehicles, a large amount of power is supplied essentially by the storage element of the power network.

During a recuperative braking phase, the energy restored must be absorbed rapidly by the high-voltage battery, and, conversely, during torque assistance phases, the high-voltage battery must be able to supply a large amount of power. A storage element of this type must therefore have very low internal resistance, in order to avoid voltage losses during the discharging phases, and excess voltages during the charging phases.

At the same time, it must have an energy level which is sufficient to be able to supply energy in a travelling phase purely in electric mode (known as ZEV, i.e. Zero Emission Vehicle), and it will be appreciated that the quantity of energy available over a long period is of primordial importance.

However, in the present state of the art, there are no electrical energy storage devices which have both strong specific power and substantial specific energy. Use is habitually made in a non-optimum manner of lithium-ion batteries which are subject to severe constraints which limit their reliability and service life.

In the article "Improvement of Drive Range, Acceleration and Deceleration Performance in an Electric Vehicle Propulsion System" presented by X. Yan et al during the 99 PESC conference ("30th annual IEEE Powers Electronics Specialists Conference", 1999, Vol. 2, pages 638-643), zinc-bromine batteries are described which are optimised in terms of their specific energy, their service life, and their low-cost, associated with ultra-capacitors which provide the power peaks.

A two-way direct-direct converter controls the charging/discharging of the two types of storage devices, according to the operative states of the vehicle (acceleration, overtaking, recuperative braking, etc.).

This converter comprises a power semiconductor half-bridge and an induction coil which are connected respectively to the ZnBr batteries and to the ultra-capacitors, such as to constitute a step-up/step-down assembly.

Control of the semiconductors of the half-bridge is simple, but in this architecture, these semiconductors are subjected to the voltages which are present at the terminals of the storage devices and on the power network, and must therefore switch large amounts of power. The cost of these semiconductors can then be high.

GENERAL DESCRIPTION OF THE INVENTION

The object of the present invention is to eliminate this disadvantage, and limit the costs of the components of an electrical supply system with double storage units of an electric or hybrid motor vehicle.

This system, which is designed to be connected to an electrical power network of the vehicle, is of the type which in itself is known, comprising a first electrical energy storage device with a first specific energy, a first specific power, and a first operating voltage, and a second electrical energy storage device with a second specific energy which is lower than the first specific energy, a second specific power which is higher than the first specific power, and a second operating voltage which is greater than the first operating voltage. In a habitual manner, the first and second electrical energy storage devices are coupled electrically by a two-way direct-direct converter which is controlled according to the operating states of the vehicle.

The electrical supply system with double storage devices of an electric or hybrid motor vehicle according to the invention is distinguished in that the direct-direct converter comprises a floating capacitor which is connected in series between the first and second electrical energy storage devices.

The direct-direct converter additionally advantageously comprises a first bridge in the form of an "H" formed by first semiconductor switching elements connected in parallel on the floating capacitor by means of first filtering elements, and coupled by a transformer to a second bridge in the form of an "H" formed by second semiconductor switching elements connected in parallel on the first electrical energy storage device by means of second filtering elements.

This direct-direct converter can firstly transfer first charges from the first electrical energy storage device to the second electrical energy storage device when the first bridge in the form of an "H" is functioning as a rectifier and the second bridge in the form of an "H" is functioning as an inverter, and can also transfer second charges from the second electrical energy storage device to the first electrical energy storage device when the first bridge in the form of an "H" is functioning as an inverter and the second bridge in the form of an "H" is functioning as a rectifier.

Preferably, the electrical supply system with double electrical energy storage devices for an electric or hybrid motor vehicle according to the invention also comprises a charger which can be connected to an electrical distribution network. This charger comprises a third bridge in the form of an "H" formed by third semiconductor switching elements which function as an inverter, and, whilst being coupled by the transformer of the direct-direct converter to the said second bridge in the form of an "H" functioning as a rectifier, constitute a cut-off supply which can charge the first electrical energy storage device from the electrical distribution network.

This charger advantageously comprises an element for correction of the power factor.

Preferably, in the electrical supply system with double electrical energy storage devices for an electric or hybrid motor vehicle according to the invention, the first, second and third bridges in the form of an "H" function in switching mode at zero voltage, or in switching mode at zero current.

The second semiconductor switching elements are advantageously of the IGBT type.

The first and third semiconductor switching elements are preferably of the MOSFET type, as are, as an alternative to the IBGT type, the second semiconductor switching elements.

Advantage is derived from the fact that in the electrical supply system with double electrical energy storage devices for an electric or hybrid motor vehicle according to the invention, the first semiconductor switching elements have a first service voltage of approximately a maximum voltage difference between the first operating voltage of the first electrical energy storage device, and the second operating voltage of the second electrical energy storage device.

The first filtering elements are also advantageously constituted by an induction coil and a capacitor with a second service voltage of approximately this maximum voltage difference.

Within the context of the invention, an electric or hybrid motor vehicle will thus highly advantageously be provided with the above-described electrical supply system with double electrical energy storage devices.

These few essential specifications will have made apparent to persons skilled in the art the advantages provided by this electrical supply system, in comparison with the prior art.

The detailed specifications of the invention are given in the description which follows in association with the accompanying drawings. It should be noted that these drawings serve the purpose simply of illustrating the text of the description, and do not constitute in any way a limitation of the scope of the invention.

DESCRIPTION OF PREFERRED
EMBODIMENTS OF THE INVENTION

Figure 1:
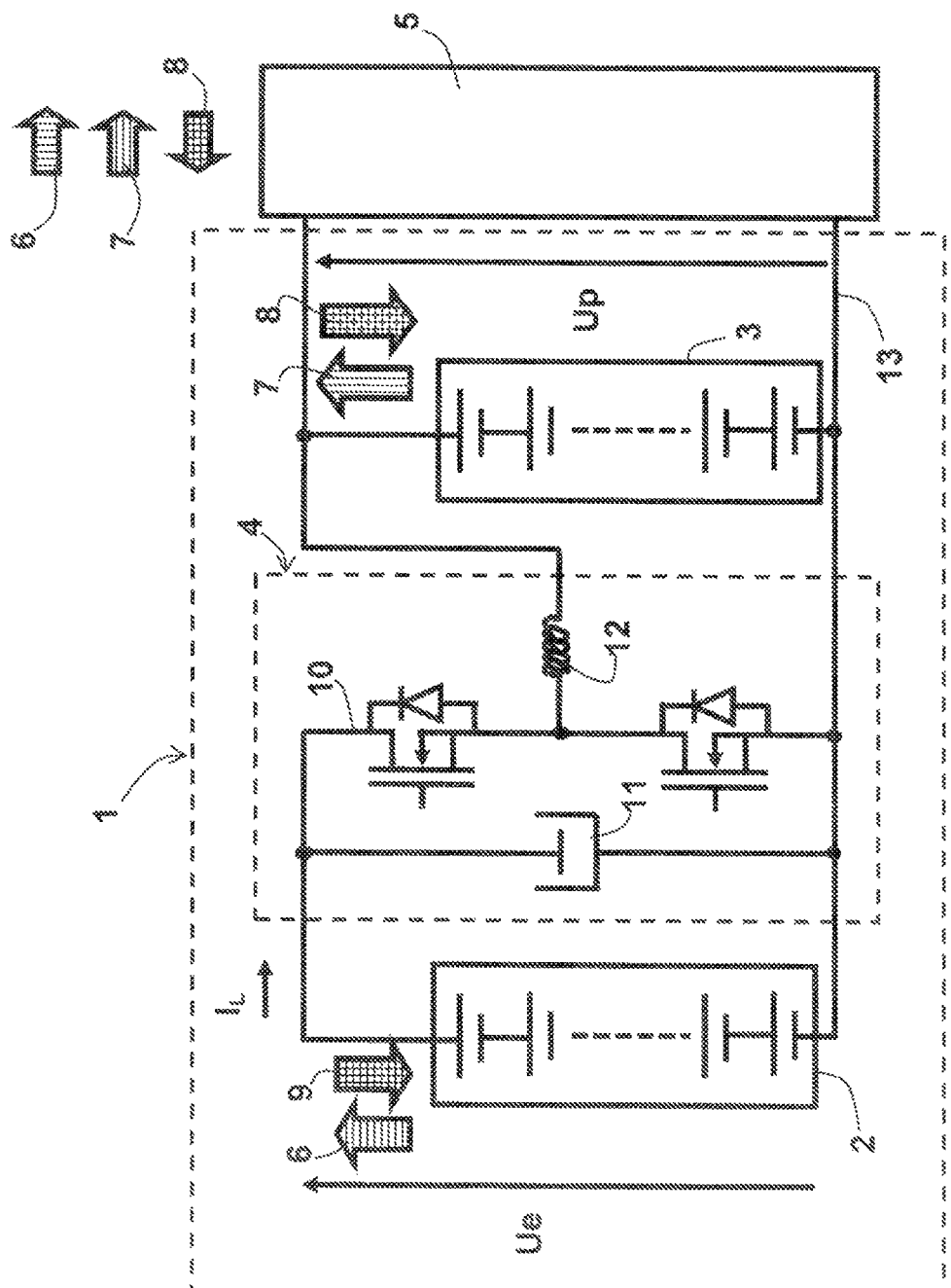
FIG. 1 is an electric diagram of an electrical supply system with double electrical energy storage devices for an electric or hybrid motor vehicle known in the prior art.

A reminder in association with FIG. 1 of the characteristics of an electrical supply system with double electrical energy storage devices 1 for an electric or hybrid motor vehicle known in the prior art will make it possible to understand well the contribution made by the invention.

FIG. 1 shows schematically a first electrical energy storage device 2 coupled electrically to a second electrical energy storage device 3 by a two-way direct-direct converter 4.

The assembly 1 is designed to be connected to a power network 5 of the vehicle, but the one of the first and second storage devices 2, 3 which can supply the power network 5 with the strongest instantaneous power is generally connected directly to this network 5.

In the example shown in FIG. 1, the first storage device 2 is considered to be the one capable of providing a lot of energy, but having only low power.

This first storage device 2 consists for example of a plurality of ZnBr cells as described in the aforementioned article, or more commonly of Li-Ion cells.

The ZnBr batteries have specific energy of between 30 and 50 W·h/kg, whereas the Li-Ion batteries have better specific energy of between 75 and 200 W·h/kg, but are more costly for the large capacities.

It is found however that the specific power of the Li-Ion batteries of between 150 and 315 W·h/kg is mostly insufficient for applications for electric or hybrid vehicles.

In fact, an urban car, a compact car with a device for increasing autonomy of the REX type (acronym for Range Extender), a van with REX or a light utility vehicle have in common the fact of having energy of 15 to 20 kW·h thanks to a relatively small battery.

However, this battery is totally incapable of supplying or absorbing power of 150 kW which occurs in a phase of acceleration, recuperative braking or rapid charging.

This power level is supplied by the second electrical energy storage device 3, which mostly consists of a set of ultra-capacitors of the EDLC type (acronym for Electric Double Layer Capacitor) grouped in series and in parallel.

The specific energy of an ultra-capacitor is low, i.e. between 2.5 and 15 W·h/kg, but its specific power can be as much as 5 kW/kg.

By generating the transfers of charges between the first storage device 2 and the second storage device 3, the two-way direct-direct converter 4 makes it possible to fulfil all the needs of the power network 5 according to the operating state of the vehicle, as clearly indicated in FIG. 1 for an electric vehicle:
- when the vehicle is travelling at a constant speed, the electrical energy 6 which supplies the electric motor is supplied to the power network 5 by the first storage device 2 by means of the direct-direct converter 4;
- when the vehicle is in an acceleration phase, excess power 7 is supplied directly to the power network 5 by the second electrical energy storage device 3;
- when the vehicle is in a recuperative braking phase, the power 8 is absorbed by the second electrical energy storage device 3, and the recuperated energy 9 is transferred to the first electrical energy storage device 2 by means of the direct-direct converter 4.

This direct-direct converter 4 comprises a power semiconductor half-bridge 10 in parallel on a capacitor 11 and an inductor 12 which are connected respectively to the first storage device 2 and to the second storage device 3 such as to constitute a step-up/step-down assembly of a conventional type.

During functioning, the active and passive electronic components 10, 11, 12 of this direct-direct converter 4 are subjected to a first voltage Ue of the first storage device, or to a second voltage Up of the second storage device 3.

These first and second voltages Ue, Up can be as much as several hundred volts, whereas the intensities which circulate can be as much as several hundred amps. As a result, the switched powers can require implementation of costly semiconductors.

Figure 2:
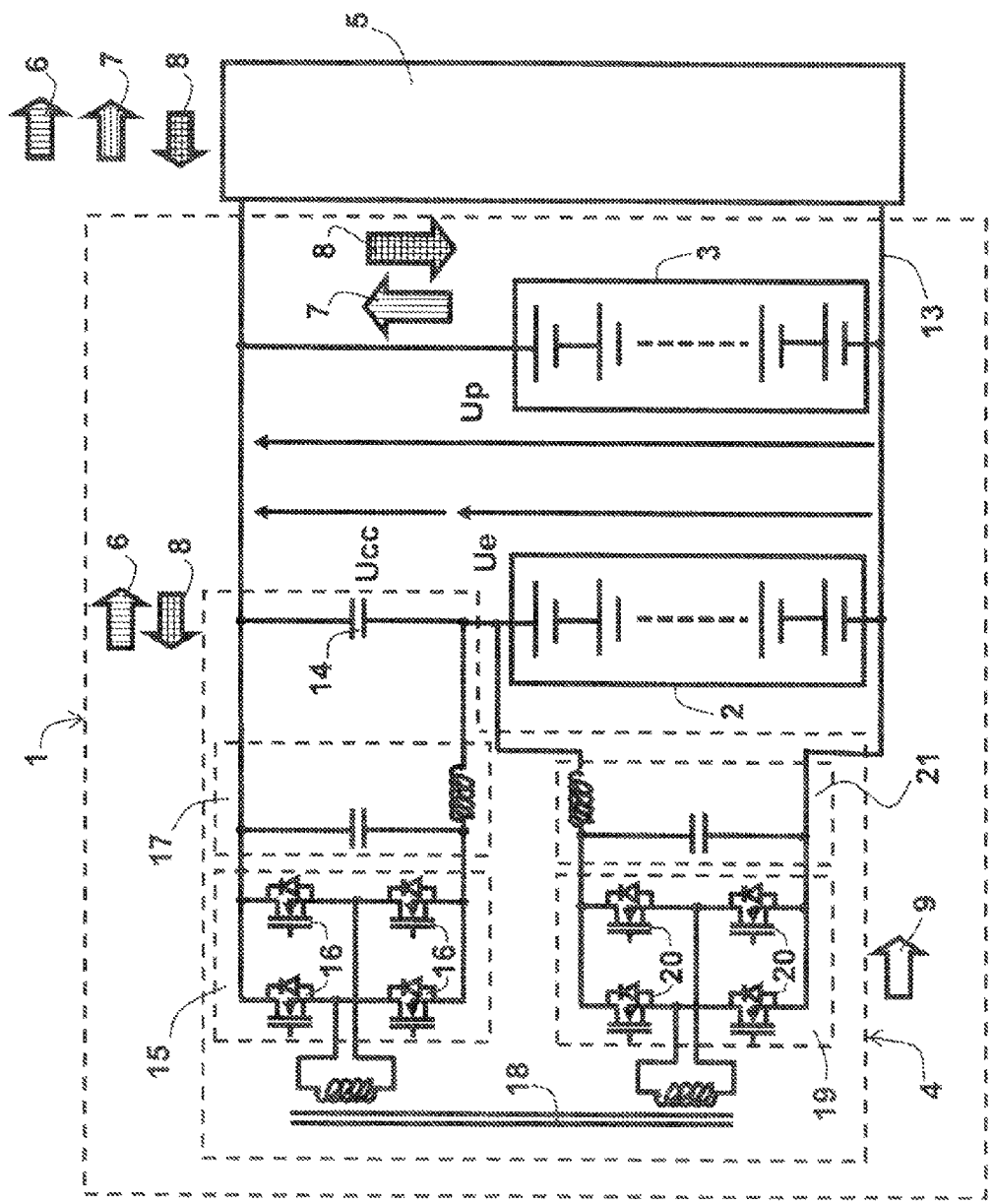
FIG. 2 is an electric diagram of an electrical supply system with double electrical energy storage devices for an electric or hybrid motor vehicle according to the invention.
Figure 3:
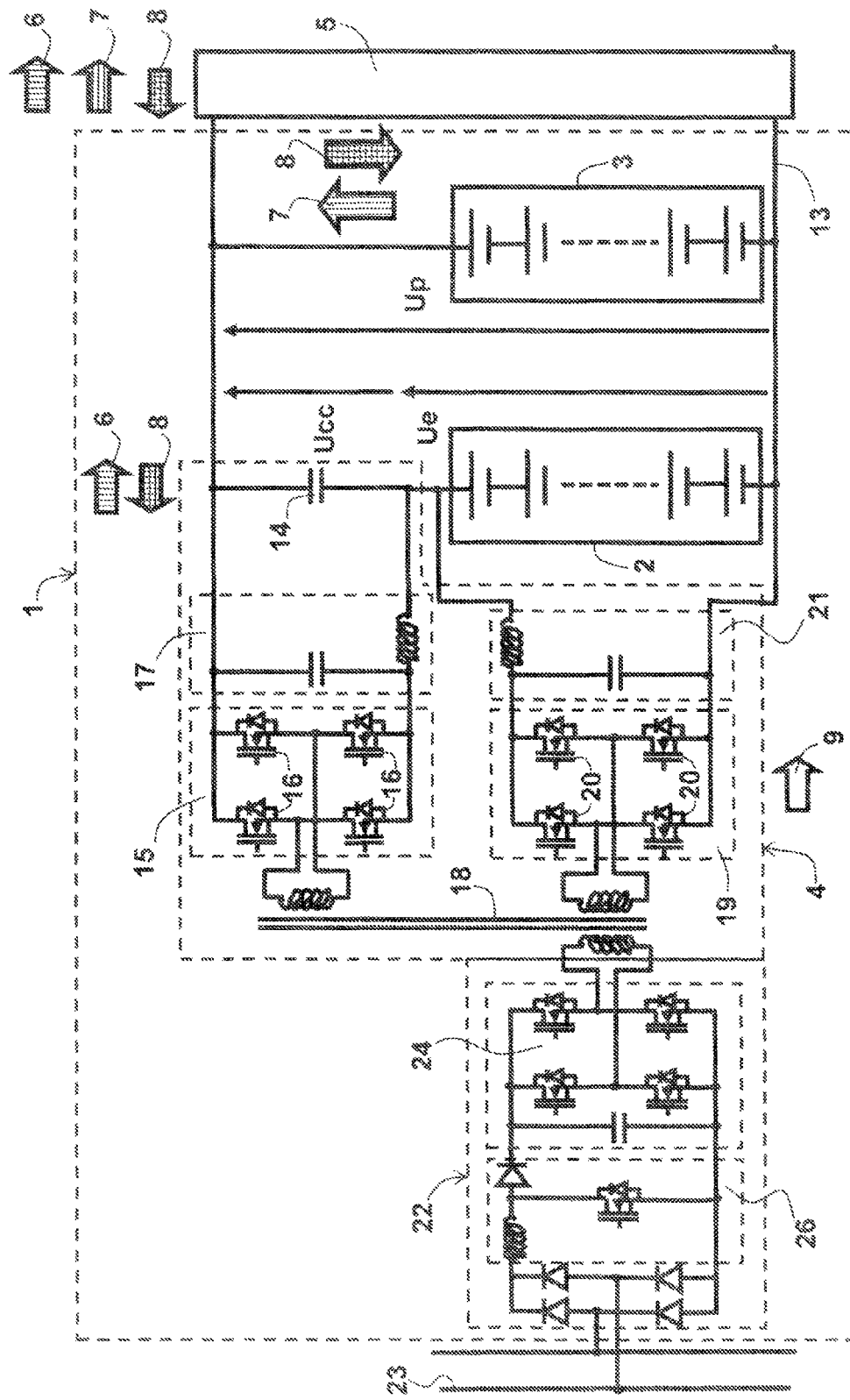
FIG. 3 is an electric diagram of a variant of an electrical supply system with double electrical energy storage devices for an electric or hybrid motor vehicle according to the invention, comprising a charger.

This disadvantage is eliminated by the electrical supply system with double electrical energy storage devices 1 according to the invention shown in FIGS. 2 and 3.

In the two preferred embodiments represented, the direct-direct converter 4 is not subjected to all of the second voltage Up, which is assumed to be the higher one, but only to the difference Ucc between the second voltage Up and the first voltage Ue, or at the most to the first voltage Ue.

Consequently, the electronic components of the direct-direct converter 4 are no longer subjected to the common mode voltages of the first and second electrical energy storage devices 2, 3 relative to the earth 13. Their service voltage is therefore lower, and the cost is lower.

In the preferred embodiment of the invention shown in FIG. 2, the direct-direct converter 4 comprises a floating capacitor 14, which is connected in series between the first electrical energy storage device 2 and the second electrical energy storage device 3.

A first bridge in the form of an "H" 15, formed by first semiconductor switching elements 16, is connected in parallel on the floating capacitor 14 by means of first filtering elements 17. It is coupled by a transformer 18 to a second bridge in the form of an "H" 19, which is formed by second semiconductor switching elements 20 and is connected in parallel on the first electrical energy storage device 2 by means of second filtering elements 21.

When the first bridge in the form of an "H" 15 is functioning as a rectifier, and the second bridge in the form of an "H" 19 is functioning as an inverter, the direct-direct converter 4 transfers first charges 6 from the first electrical energy storage device 2 to the second electrical energy storage device 3 and to the electrical power network 5.

This first functioning mode corresponds to a first operating state of the vehicle in which the electric motor of the vehicle is supplied by the electrical supply system for travel at constant speed.

When the first bridge in the form of an "H" 15 is functioning as an inverter, and the second bridge in the form of an "H" 19 is functioning as a rectifier, the direct-direct converter 4 transfers second charges 8 from the second electrical energy storage device 3 and the electrical power network 5 to the first electrical energy storage device 2.

This second functioning mode corresponds to a second operating state of the vehicle, during a recuperative braking phase, in which the power supplied by the power network 5 is absorbed by the second electrical energy storage device 3, and the recuperated energy is transferred to the first electrical energy storage device 2.

During the phase of acceleration of the vehicle, it will be remembered that the necessary power 7 is supplied by the second electrical energy storage device 3 without the direct-direct converter 4 intervening.

As a variant, as shown clearly in FIG. 3, the electrical supply system with double electrical energy storage devices 1 for an electric or hybrid motor vehicle according to the invention additionally comprises a charger 22 which can be connected to an electrical distribution network 23. This charger comprises a third bridge in the form of an "H" 24, formed by third semiconductor switching elements 25 which function as an inverter, and, by being coupled by the transformer of the direct-direct converter 4 to the second bridge in the form of an "H" 19 functioning as a rectifier, constitute a cut-off supply 19, 24, which can charge the first electrical energy storage device 2 from the electrical distribution network 23.

This cut-off supply 19, 24 is entirely static, and implements the modern operating techniques in switching mode at zero voltage (known as ZVS, an acronym for Zero Voltage Switching) on the distribution network 23 side, and in zero current mode (known as ZCS, an acronym for Zero Current Switching) on the first electrical energy storage device 2 side.

This charger 22 also advantageously comprises an element for correction of the power factor 26, which is preferably monophase, taking into account the user target concerned.

The two semiconductor switching elements 20 (represented in the form of MOSFET transistors in FIG. 3) are advantageously of the IGBT type (acronym for Insulated Gate Bipolar Transistor). This type is preferred to semiconductors of the MOSFET type (acronym for Metal Oxide Semiconductor Field Effect Transistor) since it has a lower input capacity than that of a MOSFET. The first and third semiconductor switching elements 16, 25 are preferably of the MOSFET type as are, as an alternative to the IGBT type, the second semiconductor switching elements 20. The service voltage of the first semiconductor switching elements 16 does not need to comply with the constraints imposed by the high voltages of the first and second storage devices 2, 3, and can be approximately the difference in maximum voltage (as an absolute value) which exists between the first and second voltages Ue, Up of the storage devices 2, 3.

It will be appreciated that the invention is not limited simply to the above-described preferred embodiments.

A similar description could apply to types of electrical energy storage devices 2, 3 different from those cited by way of example.

As an alternative, the first electrical energy storage device 2 and the second electrical energy storage device 3 are of the same technology, for example Li-Ion.

In this case, the first electrical energy storage device 2 works at first operating points which permit charging/discharging cycles ranging from 5 to 95% of the nominal capacity, whereas the second storage device 3 works at second operating points, giving precedence to the peak current, but with the detriment of a charge which is reduced to 40-60% of the nominal capacity.

Nor are the types of the first, second and third semiconductor switching elements 16, 20, 25 cited limiting. Persons skilled in the art will implement other types as required, particularly in the light of the powers and voltages required in use.

The invention thus incorporates all the possible variant embodiments, provided that these variants remain within the scope defined by the following claims.

The invention claimed is:

1. Electrical supply system with double electrical energy storage devices (1) for an electric or hybrid motor vehicle which is designed to be connected to a power network of said vehicle (5), of the type comprising a first electrical energy storage device (2) with a first specific energy, a first specific power, and a first operating voltage (Ue), and a second electrical energy storage device (3) with a second specific energy which is lower than the first specific energy, a second specific power which is greater than said first specific power, and a second operating voltage (Up) which is greater than said first operating voltage (Ue), said first and second electrical energy storage devices (2, 3) being coupled electrically by a two-way direct-direct converter (4) which is controlled according to the operating states of said vehicle, wherein said direct-direct converter (4) comprises a floating capacitor (14) which is connected in series between said first and second electrical energy storage devices (2, 3).

2. Electrical supply system with double electrical energy storage devices (1) for an electric or hybrid motor vehicle according to claim 1, characterized in that said direct-direct converter (4) additionally comprises a first bridge in the form of an "H" (15) formed by first semiconductor switching elements (16) connected in parallel on said floating capacitor (14) by means of first filtering elements (17), and coupled by a transformer (18) to a second bridge in the form of an "H" (19) formed by second semiconductor switching elements (20) connected in parallel on said first electrical energy storage device (2) by means of second filtering elements (21), said direct-direct converter (4) being firstly able to transfer first charges (6) from said first electrical energy storage device (2) to said second electrical energy storage device (3) when said first bridge in the form of an "H" (15) is functioning as a rectifier and said second bridge in the form of an "H" (19) is functioning as an inverter, and can also transfer second charges (8) from said second electrical energy storage device (3) to said first electrical energy storage device (2) when said first bridge in the form of an "H" (15) is functioning as an inverter and said second bridge in the form of an "H" (19) is functioning as a rectifier.

3. Electrical supply system with double electrical energy storage devices (1) for an electric or hybrid motor vehicle according to claim 2, characterized in that it additionally comprises a charger (22) which can be connected to an electrical distribution network (23), said charger (22) comprising a third bridge in the form of an "H" (24) formed by third semiconductor switching elements (25) which function as an inverter, and, whilst being coupled by said transformer (18) to said second bridge in the form of an "H" (19) functioning as a rectifier, constitute a cut-off supply (19, 24) which can charge said first electrical energy storage device (2) from said electrical distribution network (23).

4. Electrical supply system with double electrical energy storage devices (1) for an electric or hybrid motor vehicle according to claim 3, characterized in that said first, second and third bridges in the form of an "H" (15, 19, 24) function in switching mode at zero voltage, or in switching mode at zero current.

5. Electrical supply system with double electrical energy storage devices (1) for an electric or hybrid motor vehicle according to claim 3, characterized in that said second semiconductor switching elements (20) are of the IGBT type.

6. Electrical supply system with double electrical energy storage devices (1) for an electric or hybrid motor vehicle according to claim 3, characterized in that said first, second and third semiconductor switching elements (16, 20, 25) are of the MOSFET type.

7. Electrical supply system with double electrical energy storage devices (1) for an electric or hybrid motor vehicle according to claim 3, characterized in that the said first semiconductor switching elements (16) have a first service voltage of approximately a maximum voltage difference between the said first operating voltage (Ue), and the said second operating voltage (Up).

8. Electrical supply system with double electrical energy storage devices (1) for an electric or hybrid motor vehicle according to claim 3, characterized in that said charger (22) additionally comprises an element (26) for correction of the power factor.

9. Electrical supply system with double electrical energy storage devices (1) for an electric or hybrid motor vehicle according to claim 8, characterized in that said first, second and third bridges in the form of an "H" (15, 19, 24) function in switching mode at zero voltage, or in switching mode at zero current.

10. Electrical supply system with double electrical energy storage devices (1) for an electric or hybrid motor vehicle according to claim 8, characterized in that said second semiconductor switching elements (20) are of the IGBT type.

11. Electrical supply system with double electrical energy storage devices (1) for an electric or hybrid motor vehicle according to claim 8, characterized in that said first, second and third semiconductor switching elements (16, 20, 25) are of the MOSFET type.

12. Electrical supply system with double electrical energy storage devices (1) for an electric or hybrid motor vehicle according to claim 8, characterized in that the said first semiconductor switching elements (16) have a first service voltage of approximately a maximum voltage difference between the said first operating voltage (Ue), and the said second operating voltage (Up).

13. Electrical supply system with double electrical energy storage devices (1) for an electric or hybrid motor vehicle according to any one of the claim 2, characterized in that said first, second and third bridges in the form of an "H" (15, 19, 24) function in switching mode at zero voltage, or in switching mode at zero current.

14. Electrical supply system with double electrical energy storage devices (1) for an electric or hybrid motor vehicle according to claim 13, characterized in that said second semiconductor switching elements (20) are of the IGBT type.

15. Electrical supply system with double electrical energy storage devices (1) for an electric or hybrid motor vehicle according to claim 13, characterized in that said first, second and third semiconductor switching elements (16, 20, 25) are of the MOSFET type.

16. Electrical supply system with double electrical energy storage devices (1) for an electric or hybrid motor vehicle according to claim 13, characterized in that the said first semiconductor switching elements (16) have a first service voltage of approximately a maximum voltage difference between the said first operating voltage (Ue), and the said second operating voltage (Up).

17. Electrical supply system with double electrical energy storage devices (1) for an electric or hybrid motor vehicle according to any one of the claim 2, characterized in that said second semiconductor switching elements (20) are of the IGBT type.

18. Electrical supply system with double electrical energy storage devices (1) for an electric or hybrid motor vehicle according to claim 17, characterized in that the said first semiconductor switching elements (16) have a first service voltage of approximately a maximum voltage difference between the said first operating voltage (Ue), and the said second operating voltage (Up).

19. Electrical supply system with double electrical energy storage devices (1) for an electric or hybrid motor vehicle according to claim 2, characterized in that said first, second and third semiconductor switching elements (16, 20, 25) are of the MOSFET type.

20. Electrical supply system with double electrical energy storage devices (1) for an electric or hybrid motor vehicle according to claim 19, characterized in that the said first semiconductor switching elements (16) have a first service voltage of approximately a maximum voltage difference between the said first operating voltage (Ue), and the said second operating voltage (Up).

21. Electrical supply system with double electrical energy storage devices (1) for an electric or hybrid motor vehicle according to claim 2, characterized in that said first semiconductor switching elements (16) have a first service voltage of approximately a maximum voltage difference between said first operating voltage (Ue), and said second operating voltage (Up).

22. Electrical supply system with double electrical energy storage devices (1) for an electric or hybrid motor vehicle according to claim 21, characterized in that said first filtering elements (17) are constituted by an induction coil and a capacitor with a second service voltage of approximately said maximum voltage difference.

23. Electric or hybrid motor vehicle comprising an electrical supply system with double electrical energy storage devices (1) according to claim 1.

* * * * *